United States Patent
Fan et al.

(10) Patent No.: US 11,963,103 B2
(45) Date of Patent: Apr. 16, 2024

(54) METHODS AND APPARATUSES FOR PAGING

(71) Applicant: Telefonaktiebolaget LM Ericsson (publ), Stockholm (SE)

(72) Inventors: Rui Fan, Beijing (CN); Andreas Höglund, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 298 days.

(21) Appl. No.: 17/641,278

(22) PCT Filed: Sep. 11, 2019

(86) PCT No.: PCT/CN2019/105420
§ 371 (c)(1),
(2) Date: Mar. 8, 2022

(87) PCT Pub. No.: WO2021/046764
PCT Pub. Date: Mar. 18, 2021

(65) Prior Publication Data
US 2022/0346016 A1     Oct. 27, 2022

(51) Int. Cl.
*H04W 52/02*     (2009.01)
*H04W 68/00*     (2009.01)

(52) U.S. Cl.
CPC ... *H04W 52/0232* (2013.01); *H04W 52/0274* (2013.01); *H04W 68/005* (2013.01)

(58) Field of Classification Search
None
See application file for complete search history.

(56) References Cited

U.S. PATENT DOCUMENTS

| | | | |
|---|---|---|---|
| 2020/0107267 A1* | 4/2020 | Wu | H04W 76/28 |
| 2021/0360582 A1* | 11/2021 | Priyanto | H04W 4/08 |
| 2022/0174644 A1* | 6/2022 | Shi | H04W 52/0229 |

FOREIGN PATENT DOCUMENTS

| | | |
|---|---|---|
| CN | 109429315 A | 3/2019 |
| WO | 2019033112 A1 | 2/2019 |

(Continued)

OTHER PUBLICATIONS

Mediatek Inc., "Wake Up Signal Configuration for NB-IoT", 3GPP TSG RAN WG1 Meeting #92bis, R1-1804139, Sanya, China, Apr. 16-20, 2018, 1-7.

(Continued)

*Primary Examiner* — Alex Skripnikov
(74) *Attorney, Agent, or Firm* — Murphy, Bilak & Homiller, PLLC

(57) ABSTRACT

Methods and apparatuses for paging are disclosed. According to an embodiment, a paging related entity obtains first information about a probability at which each of at least one terminal device is paged at a paging occasion (PO). The paging related entity obtains second information about a first power consumption and a second power consumption spent by each of the at least one terminal device for detecting a wake up signal (WUS) and a paging message respectively. The paging related entity determines, for multiple applicable WUS to PO mapping parameters, corresponding power consumptions spent by the at least one terminal device in a paging time window (PTW), based on the first and second information. The paging related entity determines, as a target WUS to PO mapping parameter to be applied to the at least one terminal device, one of the multiple applicable WUS to PO mapping parameters corresponding to a lowest power consumption in a PTW.

14 Claims, 12 Drawing Sheets

(56) References Cited

FOREIGN PATENT DOCUMENTS

| WO | 2019063336 A1 | 4/2019 | | |
|---|---|---|---|---|
| WO | 2019168455 A1 | 9/2019 | | |
| WO | WO-2021027427 A1 * | 2/2021 | ........... | H04L 5/0053 |

OTHER PUBLICATIONS

Nokia, et al., "Wake-up signal configurations and procedures", 3GPP TSG RAN WG1 Meeting #93, R1-1806159, Busan, Korea, May 21-25, 2018, 1-6.

ZTE, et al., "Further consideration on wake-up signal", 3GPP TSG-RAN WG2 Meeting#101, R2-1802058, Athens, Greece, Feb. 26-Mar. 2, 2018, 1-6.

3GPP TSG-RAN WG2 Meeting#100, R2-1713186, Huawei, Reno, USA, Nov. 27-Dec. 1, 2017, 13 pages.

* cited by examiner

METHODS AND APPARATUSES FOR PAGING

TECHNICAL FIELD

Embodiments of the disclosure generally relate to communication, and, more particularly, to methods and apparatuses for paging.

BACKGROUND

This section introduces aspects that may facilitate better understanding of the present disclosure. Accordingly, the statements of this section are to be read in this light and are not to be understood as admissions about what is in the prior art or what is not in the prior art.

User equipment (UE) in idle mode operation needs to monitor paging. In every paging cycle, the UE wakes up in its designated time window to check whether there is a paging message. A paging cycle may be configured as discontinuous reception (DRX) or extended DRX (eDRX) cycle. The maximum DRX and eDRX cycles are 10.24 seconds and two hours, 54 minutes and 46 seconds, respectively. A paging message is carried in narrow-band physical downlink shared channel (NPDSCH) and scheduled by downlink control information (DCI) format N2 carried in narrow-band physical downlink control channel (NPDCCH).

For UEs in extreme coverage limited situations, up to 2048 repetitions may be used for transmitting a DCI. Thus, in a simple UE implementation, a UE may need to receive as many as 2048 subframes to determine whether there is a paging message sent on the associated NPDSCH (starting 4 narrow-band Internet of things (NB-IoT) subframes from the end of last NPDCCH subframe). In most cases, however, there may be no DCI format N2 sent at all during an (e)DRX cycle. Thus, from power efficiency point of view, the UE may in many cases stay awake for unnecessarily long time attempting to decode DCI format N2.

In order to further reduce the power consumption of NB-IoT UE, a new feature called wake up signal (WUS) is introduced in 3rd generation partnership project (3GPP) release-15 (R-15). The main idea of WUS is to have a signal/channel that works as an indication for the UE about whether to decode the subsequent scheduled NPDCCH/NPDSCH of paging or not. To decode the NPDCCH, UE needs to monitor the NPDCCH for paging in common search space (CSS). Therefore, the signal/channels need to be sent within some specified resources before NPDCCH CSS.

FIG. 1 illustrates how WUS works. As shown, upon receiving such a signal, the UE will attempt to decode the DCI format N2 carried in NPDCCH for paging indication. However, if the WUS is not present i.e. in discontinuous transmission (DTX) state, the UE can go back to sleep. To realize this, a sequence is transmitted in a predefined resource location if there is a paging. Otherwise, no signal is transmitted (DTX) and the resource may be scheduled for other channels.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for paging.

According to a first aspect of the disclosure, there is provided a method performed by a paging related entity. The method may comprise obtaining first information about a probability at which each of at least one terminal device is paged at a paging occasion (PO). The method may further comprise obtaining second information about a first power consumption and a second power consumption spent by each of the at least one terminal device for detecting a wake up signal (WUS) and a paging message respectively. The method may further comprise determining, for multiple applicable WUS to PO mapping parameters, corresponding power consumptions spent by the at least one terminal device in a paging time window (PTW), based on the first and second information. The method may further comprise determining, as a target WUS to PO mapping parameter to be applied to the at least one terminal device, one of the multiple applicable WUS to PO mapping parameters corresponding to a lowest power consumption in a PTW.

In this way, an optimal WUS to PO mapping parameter can be determined for the at least one terminal device to optimize the power saving thereof.

In an embodiment of the disclosure, obtaining the first information may comprise determining the first information based on records about historical paging events directed to the at least one terminal device.

In an embodiment of the disclosure, a number of the at least one terminal device may be more than one. The first information may be an average value of the probabilities at which each of the more than one terminal devices is paged at a PO.

In an embodiment of the disclosure, obtaining the second information may comprise obtaining a radio channel quality of each of the at least one terminal device. Obtaining the second information may further comprise determining the second information based on the obtained radio channel quality and a table. The table may indicate correspondences between different radio channel qualities and different first and second power consumptions. Alternatively, the table may indicate correspondences between different radio channel qualities and different ratios between the first and second power consumptions.

In an embodiment of the disclosure, a number of the at least one terminal device may be more than one. The second information may include an average value of the first power consumptions corresponding to the more than one terminal devices and an average value of the second power consumptions corresponding to the more than one terminal devices. Alternatively, the second information may be an average value of ratios between the first and second power consumptions which correspond to the more than one terminal devices.

In an embodiment of the disclosure, for an applicable WUS to PO mapping parameter, the corresponding power consumption spent by a terminal device in a PTW may be determined as: a sum of x multiplied by a first estimate of power consumption and (1−x) multiplied by a second estimate of power consumption, where x denotes the probability at which the terminal device is paged at a PO.

In an embodiment of the disclosure, the applicable WUS to PO mapping parameter may be one. The first estimate may equal to a sum of the first power consumption multiplied by a number of WUSs expected to be detected until the terminal device is paged, and the second power consumption. The second estimate may equal to the first power consumption multiplied by a number of POs in a PTW.

In an embodiment of the disclosure, the number of WUSs expected to be detected until the terminal device is paged may equal to an average value of integers from one to the number of POs in a PTW.

In an embodiment of the disclosure, the applicable WUS to PO mapping parameter may be an integer greater than one. The first estimate may equal to a sum of the second power consumption multiplied by a number of paging messages expected to be detected until the terminal device is paged, and the first power consumption. The second estimate may equal to the first power consumption multiplied by a quotient between a number of POs in a PTW and the applicable WUS to PO mapping parameter.

In an embodiment of the disclosure, the number of paging messages expected to be detected until the terminal device is paged may equal to an average value of integers from one to the applicable WUS to PO mapping parameter.

In an embodiment of the disclosure, the paging related entity may be a base station.

In an embodiment of the disclosure, obtaining the first information may comprise receiving the first information from an entity responsible for mobility management.

In an embodiment of the disclosure, obtaining the second information may comprise receiving the second information from an entity responsible for mobility management.

In an embodiment of the disclosure, the method may further comprise configuring the target WUS to PO mapping parameter to the at least one terminal device.

In an embodiment of the disclosure, the paging related entity may be an entity responsible for mobility management.

In an embodiment of the disclosure, obtaining the second information may comprise receiving the second information from a base station serving the at least one terminal device.

In an embodiment of the disclosure, the method may further comprise sending the target WUS to PO mapping parameter to a base station serving the at least one terminal device.

In an embodiment of the disclosure, the entity responsible for mobility management may be a mobility management entity (MME) or an access and mobility management function (AMF).

According to a second aspect of the disclosure, there is provided a method performed by a terminal device. The method may comprise receiving, from a base station, a target WUS to PO mapping parameter. The method may further comprise detecting one or more WUSs in a PTW based on the target WUS to PO mapping parameter. The target WUS to PO mapping parameter may be obtained by a paging related entity by obtaining first information about a probability at which each of at least one terminal device is paged at a PO. The at least one terminal device may comprise the terminal device. The target WUS to PO mapping parameter may be obtained by the paging related entity by obtaining second information about a first power consumption and a second power consumption spent by each of the at least one terminal device for detecting a WUS and a paging message respectively. The target WUS to PO mapping parameter may be obtained by the paging related entity by determining, for multiple applicable WUS to PO mapping parameters, corresponding power consumptions spent by the at least one terminal device in a PTW, based on the first and second information. The target WUS to PO mapping parameter may be obtained by the paging related entity by determining, as the target WUS to PO mapping parameter to be applied to the at least one terminal device, one of the multiple applicable WUS to PO mapping parameters corresponding to a lowest power consumption in a PTW.

In an embodiment of the disclosure, the paging related entity may be the base station or an entity responsible for mobility management.

In an embodiment of the disclosure, the entity responsible for mobility management may be an MME or an AMF.

According to a third aspect of the disclosure, there is provided a paging related entity. The paging related entity may comprise at least one processor and at least one memory. The at least one memory may contain instructions executable by the at least one processor, whereby the paging related entity may be operative to obtain first information about a probability at which each of at least one terminal device is paged at a PO. The paging related entity may be further operative to obtain second information about a first power consumption and a second power consumption spent by each of the at least one terminal device for detecting a WUS and a paging message respectively. The paging related entity may be further operative to determine, for multiple applicable WUS to PO mapping parameters, corresponding power consumptions spent by the at least one terminal device in a PTW, based on the first and second information. The paging related entity may be further operative to determine, as a target WUS to PO mapping parameter to be applied to the at least one terminal device, one of the multiple applicable WUS to PO mapping parameters corresponding to a lowest power consumption in a PTW.

In an embodiment of the disclosure, the paging related entity may be operative to perform the method according to the above first aspect.

According to a fourth aspect of the disclosure, there is provided a terminal device. The terminal device may comprise at least one processor and at least one memory. The at least one memory may contain instructions executable by the at least one processor, whereby the terminal device may be operative to receive, from a base station, a WUS to PO mapping parameter. The terminal device may be further operative to detect one or more WUSs in a PTW based on the target WUS to PO mapping parameter. The target WUS to PO mapping parameter may be obtained by a paging related entity by obtaining first information about a probability at which each of at least one terminal device is paged at a PO. The at least one terminal device may comprise the terminal device. The target WUS to PO mapping parameter may be obtained by the paging related entity by obtaining second information about a first power consumption and a second power consumption spent by each of the at least one terminal device for detecting a WUS and a paging message respectively. The target WUS to PO mapping parameter may be obtained by the paging related entity by determining, for multiple applicable WUS to PO mapping parameters, corresponding power consumptions spent by the at least one terminal device in a PTW, based on the first and second information. The target WUS to PO mapping parameter may be obtained by the paging related entity by determining, as the target WUS to PO mapping parameter to be applied to the at least one terminal device, one of the multiple applicable WUS to PO mapping parameters corresponding to a lowest power consumption in a PTW.

In an embodiment of the disclosure, the terminal device may be operative to perform the method according to the above second aspect.

According to a fifth aspect of the disclosure, there is provided a computer program product. The computer program product may comprise instructions which when executed by at least one processor, cause the at least one processor to perform the method according to any of the above first and second aspects.

According to a sixth aspect of the disclosure, there is provided a computer readable storage medium. The computer readable storage medium may comprise instructions which when executed by at least one processor, cause the at least one processor to perform the method according to any of the above first and second aspects.

According to a seventh aspect of the disclosure, there is provided a method implemented in a communication system including a base station and at least one terminal device. The method may comprise, at the base station, obtaining first information about a probability at which each of the at least one terminal device is paged at a PO. The method may further comprise, at the base station, obtaining second information about a first power consumption and a second power consumption spent by each of the at least one terminal device for detecting a WUS and a paging message respectively. The method may further comprise, at the base station, determining, for multiple applicable WUS to PO mapping parameters, corresponding power consumptions spent by the at least one terminal device in a PTW, based on the first and second information. The method may further comprise, at the base station, determining, as a target WUS to PO mapping parameter to be applied to the at least one terminal device, one of the multiple applicable WUS to PO mapping parameters corresponding to a lowest power consumption in a PTW. The method may further comprise, at the base station, configuring the target WUS to PO mapping parameter to the at least one terminal device. The method may further comprise, at the at least one terminal device, receiving, from the base station, the target WUS to PO mapping parameter. The method may further comprise, at the at least one terminal device, detecting one or more WUSs in a PTW based on the target WUS to PO mapping parameter.

According to an eighth aspect of the disclosure, there is provided a paging related entity. The paging related entity may comprise a first obtaining module for obtaining first information about a probability at which each of at least one terminal device is paged at a PO. The paging related entity may further comprise a second obtaining module for obtaining second information about a first power consumption and a second power consumption spent by each of the at least one terminal device for detecting a WUS and a paging message respectively. The paging related entity may further comprise a first determination module for determining, for multiple applicable WUS to PO mapping parameters, corresponding power consumptions spent by the at least one terminal device in a PTW, based on the first and second information. The paging related entity may further comprise a second determination module for determining, as a target WUS to PO mapping parameter to be applied to the at least one terminal device, one of the multiple applicable WUS to PO mapping parameters corresponding to a lowest power consumption in a PTW.

According to a ninth aspect of the disclosure, there is provided a terminal device. The terminal device may comprise a reception module for receiving, from a base station, a target WUS to PO mapping parameter. The terminal device may further comprise a detection module for detecting one or more WUSs in a PTW based on the target WUS to PO mapping parameter. The target WUS to PO mapping parameter may be obtained by a paging related entity by obtaining first information about a probability at which each of at least one terminal device is paged at a PO. The at least one terminal device may comprise the terminal device. The target WUS to PO mapping parameter may be obtained by the paging related entity by obtaining second information about a first power consumption and a second power consumption spent by each of the at least one terminal device for detecting a WUS and a paging message respectively. The target WUS to PO mapping parameter may be obtained by the paging related entity by determining, for multiple applicable WUS to PO mapping parameters, corresponding power consumptions spent by the at least one terminal device in a PTW, based on the first and second information. The target WUS to PO mapping parameter may be obtained by the paging related entity by determining, as the target WUS to PO mapping parameter to be applied to the at least one terminal device, one of the multiple applicable WUS to PO mapping parameters corresponding to a lowest power consumption in a PTW.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

In 3GPP R-15, only one sequence per paging occasion was defined for WUS, forcing all UEs allocated to that PO to wake up and read paging even though only one UE is paged. WUS is a signal that needs to be detected by all UEs.

In 3GPP R-16, it is currently under standardization to introduce group based WUS. Group based WUS could let evolved node B (eNB) wake up a single UE group independently of other UE groups, besides waking up all UEs simultaneously.

Figure 1:
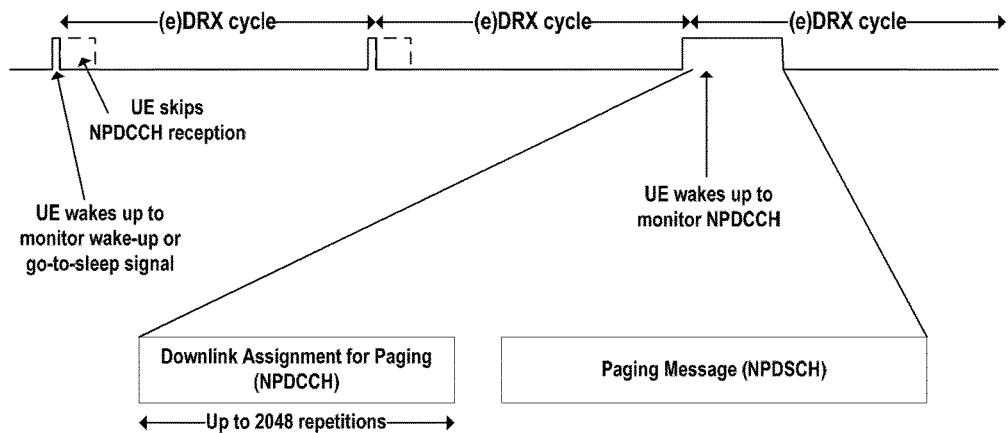
FIG. 1 is a diagram illustrating the working mechanism of WUS.
Figure 2:
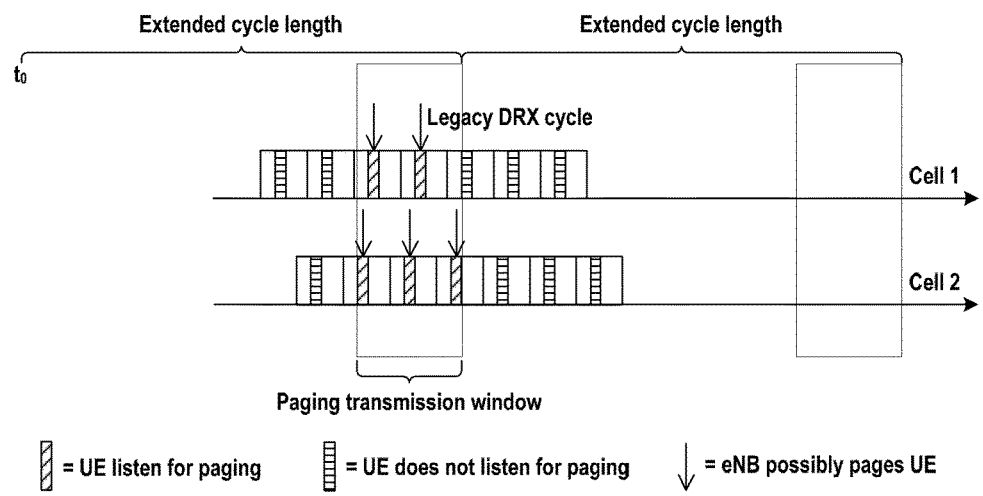
FIG. 2 is a diagram illustrating the working mechanism of eDRX.

Since UE in idle mode can be in either DRX or eDRX to listen to paging, WUS needs to work for UE either in DRX or in eDRX. The eDRX is a feature introduced in R-13 for NB-IoT. A UE configured with an eDRX cycle monitors the control channel for paging during a paging timing window (PTW) shown in FIG. 2 in a paging hyper-frame (PH) based on a formula that is known by the mobility management entity (MME), UE and eNB as a function of the eDRX cycle and UE identity. During the PTW, the UE monitors paging for the duration of the PTW (as configured by non-access stratum (NAS)) or until a paging message is received for the UE, i.e. whichever is earlier. PH is determined through: H-SFN mod $T_{eDRX}$=(UE_ID mod $T_{eDRX}$), where UE_ID=IMSI mod 1024 and $T_{eDRX}$ is the eDRX cycle in hyper-frames. The term H-SFN refers to hyper system frame number and the term IMSI refers to international mobile subscriber identity. Within a PH, the PTW starting points are distributed across a number of starting points (4 starting points distributed according to UE_ID). Upper layers (NAS) are responsible for configuration of eDRX in idle mode.

The requirements in terms of reachability differs significantly between DRX and eDRX UEs. For DRX, a UE should be reached as soon as possible, whereas for eDRX, it is sufficient to reach it within the PTW.

For UEs in DRX and the default configuration in eDRX, there is a 1-to-1 mapping between the WUS and PO, meaning that the WUS only indicates paging for one PO and one PO only has one WUS associated with it.

However, for eDRX, the less demanding reachability implies that WUS may be transmitted less often and still be reached within its PTW. For that reason, an optional 1-to-N mapping is defined, where N={1, 2, 4}, implying that if the UE does not detect the WUS, it can sleep for N DRX periods within the PTW before it needs to detect WUS again. If the UE detects WUS, it is required to monitor NPDCCH in all the subsequent N POs, allowing for some network scheduling flexibility.

The current standard only specifies that the mapping from WUS to PO for eDRX can be N={1, 2, 4}. However, there is no rule for eNB to know which value to choose for eDRX UE. Randomly configuring N for eDRX UE could result in performance degradation.

The present disclosure proposes an improved solution for paging. The basic idea of the solution is to make sure that terminal device(s) can benefit from WUS if WUS is configured to the terminal device(s). Hereinafter, the solution will be described in detail with reference to FIGS. 3-18.

Figure 3:
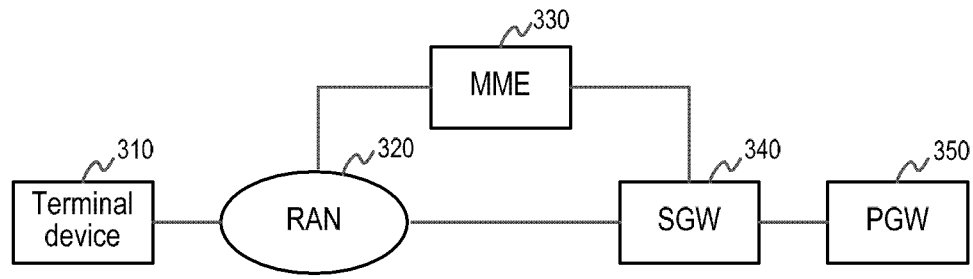
FIG. 3 is a diagram illustrating an exemplary communication system into which an embodiment of the disclosure is applicable.

FIG. 3 is a diagram showing an exemplary communication system into which an embodiment of the disclosure is applicable. As shown, the communication system comprises a terminal device 310, a radio access network (RAN) 320, a mobility management entity (MME) 330, a serving gateway (SGW) 340 and a packet data network (PDN) gateway (PGW) 350. Note that the number of each entity mentioned above may be more than one.

The terminal device 310 can communicate through a radio access communication link with the RAN 320. The communication may be performed according to any suitable communication protocols. The terminal device may also be referred to as, for example, user equipment (UE), mobile station, mobile unit, subscriber station, access terminal, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The RAN 320 may include, for example, a universal mobile telecommunications system (UMTS) terrestrial RAN (UTRAN), a global system for mobile communication (GSM)/enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to terminal devices that are within their respective communication service cells. The E-UTRAN can include radio base station nodes (eNodeBs) that can provide the combined functionality of the RNC nodes and base stations of the UTRAN and the GERAN.

The MME 330 is a core network node in evolved packet system (EPS) and can carry out mobility management of the terminal device 310, bearer management, and the like. The SGW 340 can route and forward signalling and user data packets, while also acting as the mobility anchor for user plane during inter-base station/eNodeB handovers and as the anchor for mobility between long term evolution (LTE) and other 3GPP technologies. The PGW 350 can provide entry and exit points to a packet-based network for the traffic of the terminal device 310 flowing through the SGW 340. The packet-based network may include the Internet and/or other packet network elements.

It should be noted that the above components are merely exemplary examples of the components in the communication system and may be replaced by components with similar functionalities. For example, in the 5th generation (5G) system, the MME may be replaced by an access and mobility management function (AMF). Thus, the specific terms used herein do not limit the present disclosure only to the communication system related to the specific terms, which however can be more generally applied to other communication systems.

Figure 4:
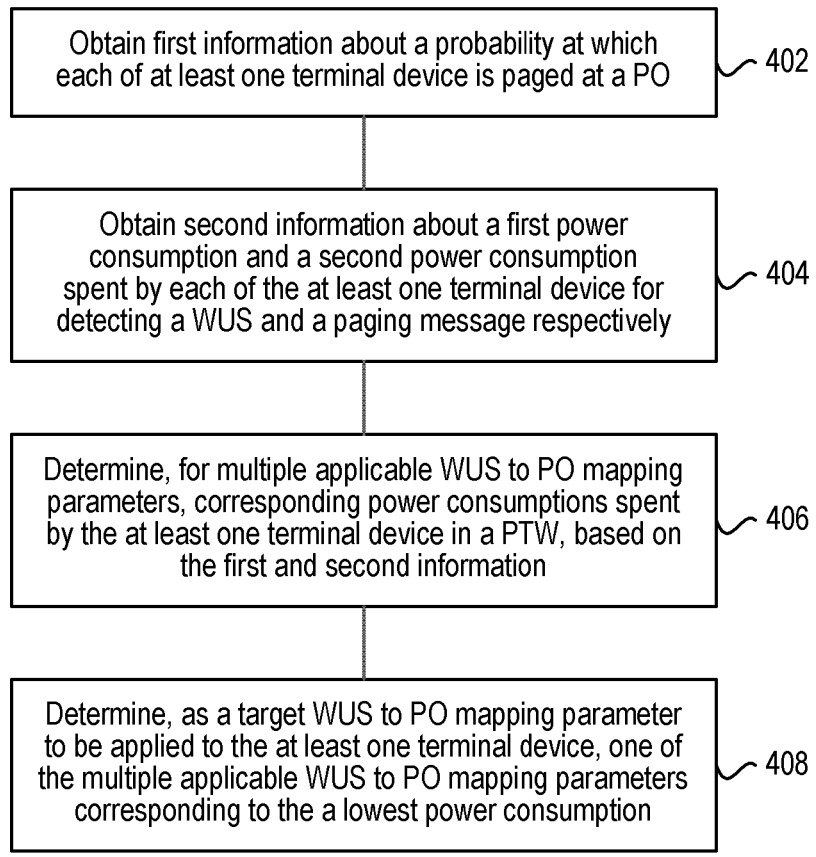
FIG. 4 is a flowchart illustrating a method implemented at a paging related entity according to an embodiment of the disclosure.

FIG. 4 is a flowchart illustrating a method implemented at a paging related entity according to an embodiment of the disclosure. As an example, the paging related entity may be a base station. As another example, the paging related entity may be an entity responsible for mobility management, such as an MME in LTE or an AMF in 5G. At block 402, the paging related entity obtains first information about a probability at which each of at least one terminal device is paged at a PO. The at least one terminal device may be one terminal device or more than one terminal devices (e.g. a group of terminal devices or all terminal devices in a cell), for which a target WUS to PO mapping parameter is to be configured. Thus, the at least one terminal device may operate in eDRX mode. If the number of the at least one terminal device is one, the first information may be the probability at which this terminal device is paged at a PO. If the number of the at least one terminal device is more than one, the first information may be an average value of the probabilities at which each of the more than one terminal devices is paged at a PO.

For the example that the paging related entity is a base station (hereinafter simply referred to as the example of the base station), block 402 may be implemented as block 502 of FIG. 5 or block 602 of FIG. 6. At block 502, the base station determines the first information based on records about historical paging events directed to the at least one terminal device. As an exemplary example, for a terminal device, the number of times an actual paging occurred for this terminal device and the number of POs may be counted for a predetermined time period and a quotient between the number of times and the number of POs may be calculated as the probability for this terminal device. For example, the records about the number of times and the number of POs may be maintained by the base station. As another example, the records may be maintained by an entity responsible for mobility management and provided to the base station as needed.

At block 602, the base station receives the first information from an entity responsible for mobility management. In this case, the first information may be calculated by the entity responsible for mobility management in a way similar to block 502 and sent to the base station.

For the example that the paging related entity is an entity responsible for mobility management (hereinafter simply referred to as the example of the entity responsible for mobility management), block 402 may be implemented as block 502 of FIG. 5. At block 502, the entity responsible for mobility management determines the first information based on records about historical paging events directed to the at least one terminal device. Similar to the example of the base station, for a terminal device, the number of times an actual paging occurred for this terminal device and the number of POs may be counted for a predetermined time period and a quotient between the number of times and the number of POs may be calculated as the probability for this terminal device. Since paging is initiated by the entity responsible for mobility management, so the records about the number of times and the number of POs may be conveniently maintained by the entity responsible for mobility management.

Referring back to FIG. 4, at block 404, the paging related entity obtains second information about a first power consumption and a second power consumption spent by each of the at least one terminal device for detecting a WUS and a paging message respectively. If the number of the at least one terminal device is one, the second information may include the first and second power consumptions or the ratios therebetween. If the number of the at least one terminal device is more than one, the second information may include an average value of the first power consumptions corresponding to the more than one terminal devices and an average value of the second power consumptions corresponding to the more than one terminal devices. Alternatively, the second information may be an average value of the ratios between the first and second power consumptions which correspond to the more than one terminal devices.

Figure 5:
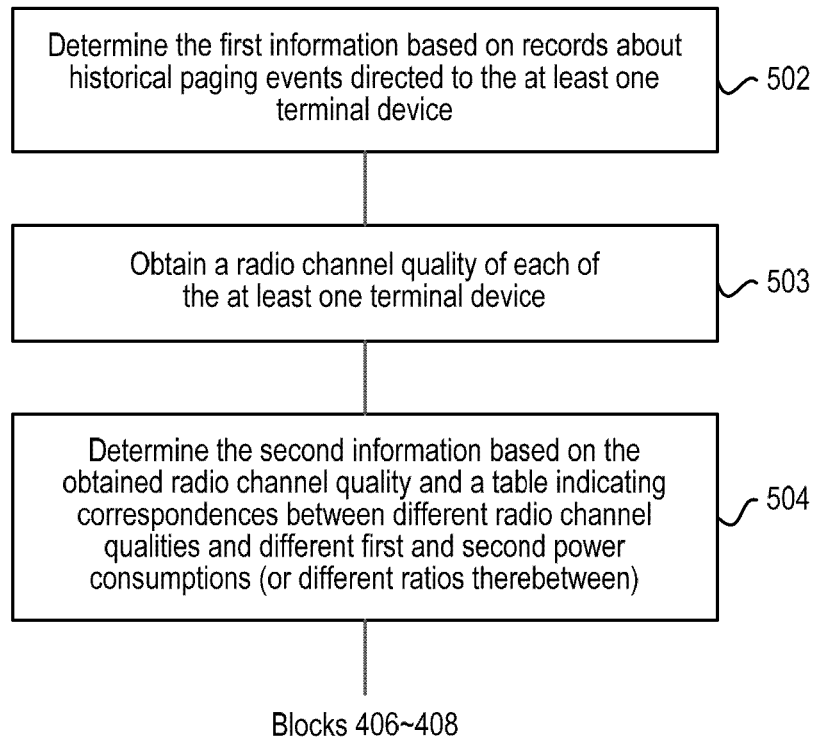
FIG. 5 is a flowchart illustrating a method implemented at a paging related entity according to another embodiment of the disclosure.
Figure 6:
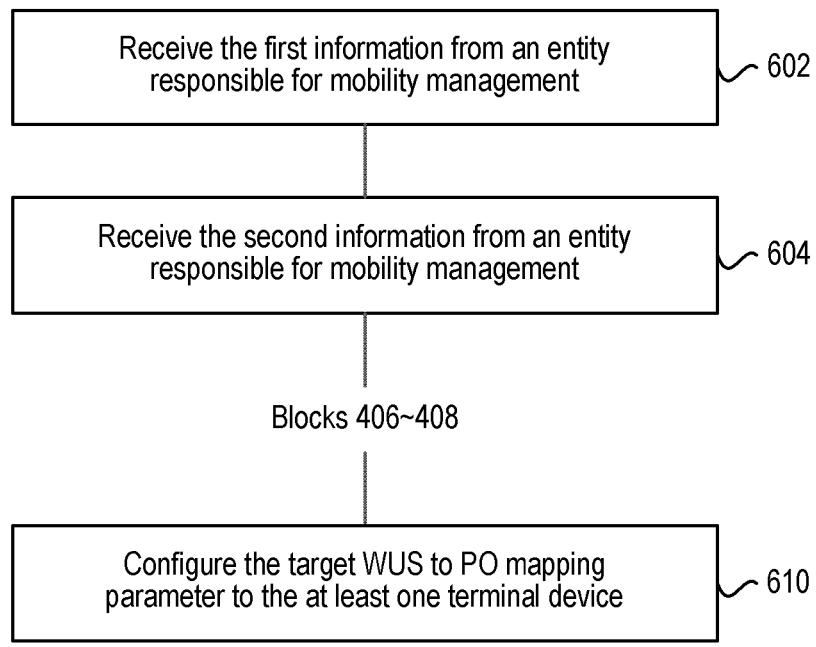
FIG. 6 is a flowchart illustrating a method implemented at a base station according to an embodiment of the disclosure.

For the example of the base station, block 404 may be implemented as blocks 503-504 of FIG. 5 or block 604 of FIG. 6. At block 503, the base station obtains a radio channel quality of each of the at least one terminal device. For example, the radio channel quality may be obtained by receiving measurement reports from each of the at least one terminal device. At block 504, the base station determines the second information based on the obtained radio channel quality and a table. The table may indicate correspondences between different radio channel qualities and different first and second power consumptions. Alternatively, the table may indicate correspondences between different radio channel qualities and different ratios between the first and second power consumptions. As an exemplary example, the table may be generated according to a lab test by measuring the first and second power consumptions of terminal device(s) under different radio channel conditions and recording them.

At block 604, the base station receives the second information from an entity responsible for mobility management. In this case, the second information may be determined by the entity responsible for mobility management in a way similar to blocks 503-504 and sent to the base station as needed.

Figure 7:
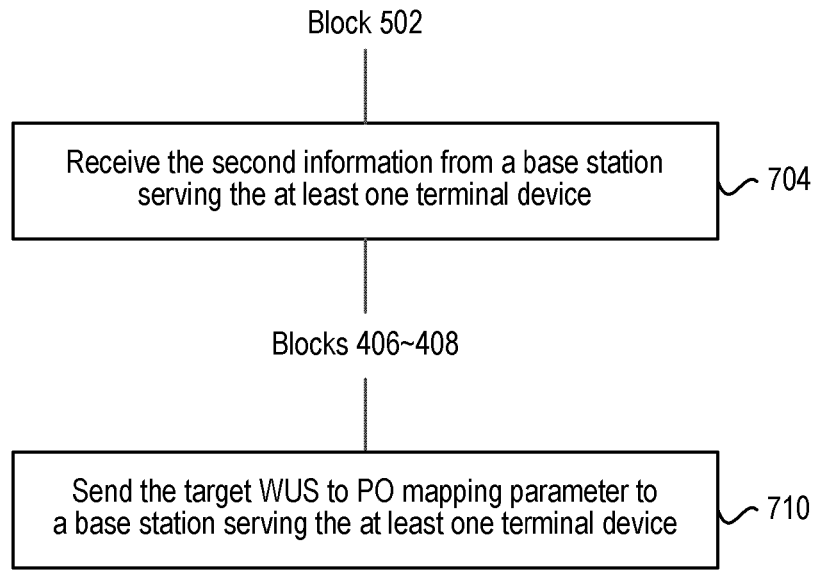
FIG. 7 is a flowchart illustrating a method implemented at an entity responsible for mobility management according to an embodiment of the disclosure.

For the example of the entity responsible for mobility management, block 404 may be implemented as blocks 503-504 of FIG. 5 or block 704 of FIG. 7. At block 503, the entity responsible for mobility management obtains a radio channel quality of each of the at least one terminal device. For example, the radio channel quality may be obtained by receiving measurement reports from each of the at least one terminal device via a base station serving the at least one terminal device. At block 504, the entity responsible for mobility management determines the second information based on the obtained radio channel quality and a table. The table may indicate correspondences between different radio channel qualities and different first and second power consumptions. Alternatively, the table may indicate correspondences between different radio channel qualities and different ratios between the first and second power consumptions. As an exemplary example, the table may be generated according to a lab test by measuring the first and second power consumptions of terminal device(s) under different radio channel conditions and recording them.

Blocks 503-504 may be based on the consideration that for UE with good radio channel quality, the power consumption of WUS detection and paging message detection could be similar as the least downlink (DL) subframe for WUS and paging message transmission is the same, i.e. one DL subframe. For UE with bad radio channel quality, the power consumption of WUS detection could be quite smaller compared to that of paging message detection as WUS only contains one valid bit but paging message contains many bits to detect.

At block 704, the entity responsible for mobility management receives the second information from a base station serving the at least one terminal device. In this case, the second information may be determined by the base station as described above with respect to blocks 503-504 and sent to the entity responsible for mobility management.

Referring back to FIG. 4, at block 406, the paging related entity determines, for multiple applicable WUS to PO mapping parameters, corresponding power consumptions spent by the at least one terminal device in a PTW, based on the first and second information. According to the current standard, the multiple applicable WUS to PO mapping parameters may be 1, 2 and 4. For example, for an applicable WUS to PO mapping parameter, the corresponding power consumption spent by a terminal device in a PTW may be determined as: a sum of x multiplied by a first estimate of power consumption and (1−x) multiplied by a second estimate of power consumption, where x denotes the probability at which the terminal device is paged at a PO. The parameter x may be indicated by the first information. The first and second power consumptions may be indicated by the second information.

If the applicable WUS to PO mapping parameter is one, the first estimate may equal to a sum of the first power consumption multiplied by a number of WUSs expected to be detected until the terminal device is paged, and the second power consumption. The second estimate may equal to the first power consumption multiplied by a number of POs in a PTW. This may be based on the consideration that for this 1 to 1 mapping, the pros are that when there is paging, the power consumption for UE is low as the power consumption for paging detection is valid. The cons are that if there is no paging, the power consumption for UE is high as UE needs to detect multiple WUS signals in a PTW.

As an exemplary example, the number of WUSs expected to be detected until the terminal device is paged may equal to an average value of integers from one to the number of POs in a PTW. That is, for 1 to 1 mapping, the power consumption for a terminal device in a PTW can be calculated as:

$$powerconsumption = \\ x * \left( powerdetectionofPaging + \frac{powerdetectionofWUS}{M} * \sum_{i=1}^{M} i \right) + \\ (1-x) * M * powerdetectionofWUS,$$

where 1−x denotes the probability that there is no paging directed to the terminal device in a PTW, and M is the number of WUSs or POs needed to detect in a PTW. That is, if there is no paging, the power consumption is to detect M WUS signals. If there is paging, the power consumption is to detect one paging message plus detection of a number of WUSs. Here, it is assumed that the possibility that paging is in one of the M POs is equal.

If the applicable WUS to PO mapping parameter is an integer greater than one, the first estimate may equal to a sum of the second power consumption multiplied by a number of paging messages expected to be detected until the terminal device is paged, and the first power consumption. The second estimate may equal to the first power consumption multiplied by a quotient between a number of POs in a PTW and the applicable WUS to PO mapping parameter. This may be based on the consideration that for this 1 to N mapping, the pros are that when there is no paging, the power consumption is low as UE can sleep for N DRX cycles in a PTW. The cons are that when there is paging, the power consumption is high as UE needs to detect paging in all POs belonging to the WUS but only one will contain paging.

As an exemplary example, the number of paging messages expected to be detected until the terminal device is paged may equal to an average value of integers from one to the applicable WUS to PO mapping parameter. That is, for 1 to N mapping, the power consumption for a terminal device in a PTW can be calculated as:

$$powerconsumption = \\ x * \left( powerdetectionofWUS + \frac{powerdetectionofpaging}{N} * \sum_{i=1}^{N} i \right) + \\ K * (1-x) * powerdetectionofWUS,$$

where N is the number of POs one WUS corresponds to, K=M/N, and M is the total number of POs in a PTW. It is assumed that the possibility that paging is in one of the N POs is equal. That is, if there is no paging, the power consumption is to detect K WUS signals. If there is paging, the power consumption is to detect one WUS signal plus detection of a number of paging messages.

Figure 8:
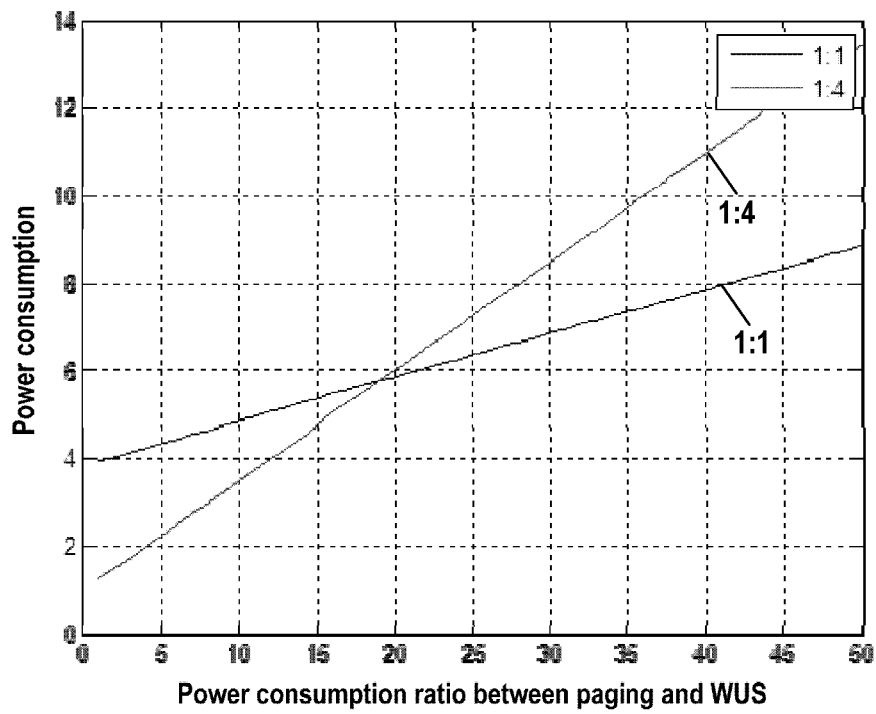
FIG. 8 is a diagram showing the simulated power consumption at UE with different WUS to PO mapping parameters.

As can be seen, the power consumption in a PTW is dependent to the probability whether a PO includes an actual paging message or not (which may also be called paging traffic load/pattern), the power consumption of WUS detection and power consumption of paging detection. FIG. 8 shows the power consumption at UE with N configured to 1 and configured to 4 when the power consumption ratio between detection of paging and WUS varies. The probability x (which may also be called paging message ratio) is assumed to be 10%, i.e. every 10 POs, there is one paging message. It can be seen that there is a cross point between the two lines, which means the optimal N differs according to different conditions, e.g. paging traffic pattern, UE power consumption to detect WUS or paging.

At block 408, the paging related entity determines, as a target WUS to PO mapping parameter to be applied to the at least one terminal device, one of the multiple applicable WUS to PO mapping parameters corresponding to a lowest power consumption in a PTW. In this way, an optimal WUS to PO mapping parameter can be determined for the at least one terminal device to optimize the power saving thereof, since the target mapping parameter is determined according to actual collected information.

As an exemplary example for the method of FIG. 4, if WUS to PO mapping is configured for a specific UE, the paging related entity (e.g. eNB or MME/AMF) can first check this specific UE's paging traffic pattern (or paging ratio), the radio quality of this UE to obtain the power detection of WUS and paging for this UE, and then calculate the power consumptions when one WUS maps to different number of POs. With the power consumptions calculated for different N={1,2,4}, the paging related entity can compare the power consumptions of different configurations, and then select N with the minimal power consumption for this specific UE.

As another exemplary example, if WUS to PO mapping is configured for a group of UEs in a cell, the paging related entity (e.g. eNB or MME/AMF) can collect the average paging traffic pattern for that group of UEs in the cell, and then also the average power ratio to detect WUS and paging of that group of UEs in the cell, and then calculate the power consumptions when one WUS maps to different number of POs. With the power consumptions calculated for different N={1,2,4}, the paging related entity can compare the power consumptions of different configurations, and then select N with the minimal power consumption for that group of UEs.

As another exemplary example, if WUS to PO mapping needs to be configured for all UEs in a cell, the paging related entity (e.g. eNB or MME/AMF) can collect the average paging traffic pattern for all UEs in the cell, and then also the average power ratio to detect WUS and paging of all UEs in the cell, and then calculate the power consumptions when one WUS maps to different number of POs. With the power consumptions calculated for different N={1,2,4}, the paging related entity can compare the power consumptions of different configurations, and then select N with the minimal power consumption for all UEs in the cell.

By using the method of FIG. 4, any one or more of the following decisions may be made by the paging related entity: 1) a larger N is configured to a UE, a group of UEs, all UEs in a cell with smaller paging traffic load; 2) a smaller N is configured to a UE, a group of UEs, all UEs in a cell with larger paging traffic load; 3) a larger N is configured to a UE, a group of UEs with better (average) radio link quality; 4) a smaller N is configured to a UE, a group of UEs with worse (average) radio link quality; 5) a larger N is configured to a UE, a group of UEs with smaller paging traffic load and better (average) radio link quality; 6) a smaller N is configured to a UE, a group of UEs with larger paging traffic load and worse (average) radio link quality.

FIG. 5 is a flowchart illustrating a method implemented at a paging related entity according to another embodiment of the disclosure. As described above, some blocks of the method may be used for explaining the method of FIG. 4. As shown, the method of FIG. 5 comprises blocks 502-504 and 406-408. Since these blocks have been described above, their details are omitted here for brevity.

FIG. 6 is a flowchart illustrating a method implemented at a base station according to an embodiment of the disclosure. As described above, some blocks of the method may be used for explaining the method of FIG. 4. As shown, the method of FIG. 6 comprises blocks 602-604, 406-408 and 610. Blocks 602-604 and 406-408 have been described above and their details are omitted here. At block 610, the base station configures the target WUS to PO mapping parameter to the at least one terminal device. In this way, the power saving of the at least one terminal device can be optimized. For example, the target WUS to PO mapping parameter may be configured in system information block (SIB).

FIG. 7 is a flowchart illustrating a method implemented at an entity responsible for mobility management according to an embodiment of the disclosure. As described above, some blocks of the method may be used for explaining the method of FIG. 4. As shown, the method comprises blocks 502, 704, 406-408 and 710. Blocks 502, 704 and 406-408 have been described above and their details are omitted here. At block 710, the entity responsible for mobility management sends the target WUS to PO mapping parameter to a base station serving the at least one terminal device. In this way, it is possible for the base station to configure the target WUS to PO mapping parameter to the at least one terminal device.

Figure 9:
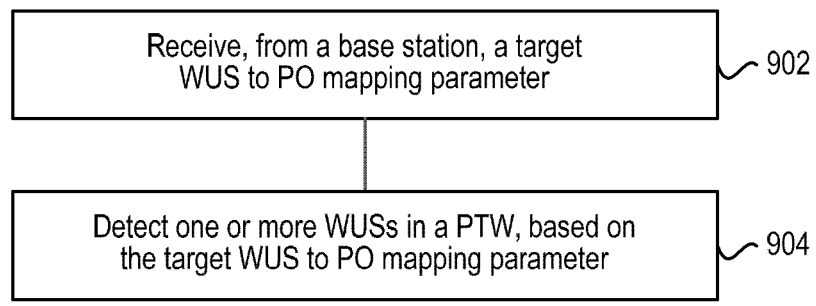
FIG. 9 is a flowchart illustrating a method implemented at a terminal device according to an embodiment of the disclosure.

FIG. 9 is a flowchart illustrating a method implemented at a terminal device according to an embodiment of the disclosure. At block 902, the terminal device receives, from a base station, a target WUS to PO mapping parameter. At block 904, the terminal device detects one or more WUSs in a PTW, based on the target WUS to PO mapping parameter. The target WUS to PO mapping parameter may be obtained by a paging related entity by obtaining first information about a probability at which each of at least one terminal device is paged at a PO. The at least one terminal device may comprise the terminal device. The target WUS to PO mapping parameter may be obtained by the paging related entity by obtaining second information about a first power consumption and a second power consumption spent by each of the at least one terminal device for detecting a WUS and a paging message respectively. The target WUS to PO mapping parameter may be obtained by the paging related entity by determining, for multiple applicable WUS to PO mapping parameters, corresponding power consumptions spent by the at least one terminal device in a PTW, based on the first and second information. The target WUS to PO mapping parameter may be obtained by the paging related entity by determining, as the target WUS to PO mapping parameter to be applied to the at least one terminal device, one of the multiple applicable WUS to PO mapping parameters corresponding to a lowest power consumption in a PTW. Since the target WUS to PO mapping parameter is obtained in such a way, the power saving of the terminal device can be optimized. It should be noted that two blocks shown in succession in the figures may, in fact, be executed substantially concurrently, or the blocks may sometimes be executed in the reverse order, depending upon the functionality involved.

Based on the above description, in at least one aspect, the present disclosure provides a method implemented in a communication system including a base station and at least one terminal device. The method may comprise, at the base station, obtaining first information about a probability at which each of the at least one terminal device is paged at a PO. The method may further comprise, at the base station, obtaining second information about a first power consumption and a second power consumption spent by each of the at least one terminal device for detecting a WUS and a paging message respectively. The method may further comprise, at the base station, determining, for multiple applicable WUS to PO mapping parameters, corresponding power consumptions spent by the at least one terminal device in a PTW, based on the first and second information. The method may further comprise, at the base station, determining, as a target WUS to PO mapping parameter to be applied to the at least one terminal device, one of the multiple applicable WUS to PO mapping parameters corresponding to a lowest power consumption in a PTW. The method may further comprise, at the base station, configuring the target WUS to PO mapping parameter to the at least one terminal device. The method may further comprise, at the at least one terminal device, receiving, from the base station, the target WUS to PO mapping parameter. The method may further comprise, at the at least one terminal device, detecting one or more WUSs in a PTW based on the target WUS to PO mapping parameter.

Figure 10:
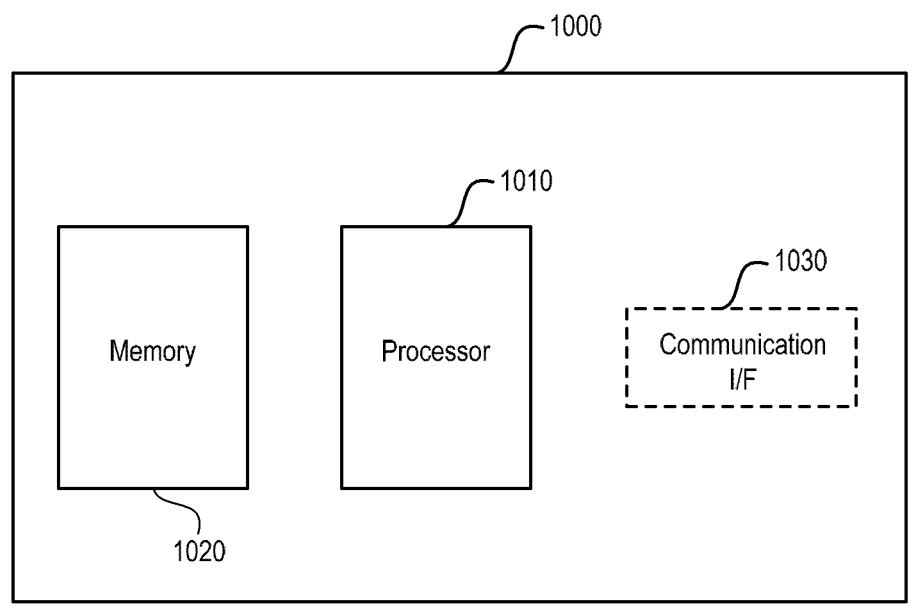
FIG. 10 is a block diagram showing an apparatus suitable for use in practicing some embodiments of the disclosure.

FIG. 10 is a block diagram showing an apparatus suitable for use in practicing some embodiments of the disclosure. For example, any one of the terminal device and the base station described above may be implemented through the apparatus 1000. As shown, the apparatus 1000 may include a processor 1010, a memory 1020 that stores a program, and optionally a communication interface 1030 for communicating data with other external devices through wired and/or wireless communication.

The program includes program instructions that, when executed by the processor 1010, enable the apparatus 1000 to operate in accordance with the embodiments of the present disclosure, as discussed above. That is, the embodiments of the present disclosure may be implemented at least in part by computer software executable by the processor 1010, or by hardware, or by a combination of software and hardware.

The memory 1020 may be of any type suitable to the local technical environment and may be implemented using any suitable data storage technology, such as semiconductor based memory devices, flash memories, magnetic memory devices and systems, optical memory devices and systems, fixed memories and removable memories. The processor 1010 may be of any type suitable to the local technical environment, and may include one or more of general purpose computers, special purpose computers, microprocessors, digital signal processors (DSPs) and processors based on multi-core processor architectures, as non-limiting examples.

Figure 11:
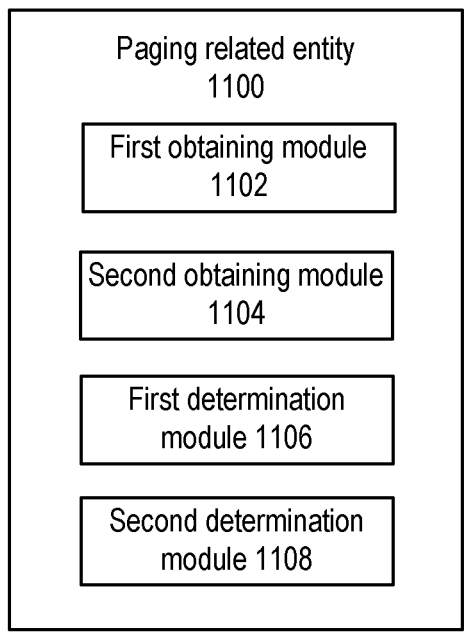
FIG. 11 is a block diagram showing a paging related entity according to an embodiment of the disclosure.

FIG. 11 is a block diagram showing a paging related entity according to an embodiment of the disclosure. As shown, the paging related entity 1100 comprises a first obtaining module 1102, a second obtaining module 1104, a first determination module 1106 and a second determination module 1108. The first obtaining module 1102 may be configured to obtain first information about a probability at which each of at least one terminal device is paged at a PO, as described above with respect to block 402. The second obtaining module 1104 may be configured to obtain second information about a first power consumption and a second power consumption spent by each of the at least one terminal device for detecting a WUS and a paging message respectively, as described above with respect to block 404. The first determination module 1106 may be configured to determine, for multiple applicable WUS to PO mapping parameters, corresponding power consumptions spent by the at least one terminal device in a PTW, based on the first and second information, as described above with respect to block 406. The second determination module 1108 may be configured to determine, as a target WUS to PO mapping parameter to be applied to the at least one terminal device, one of the multiple applicable WUS to PO mapping parameters corresponding to a lowest power consumption in a PTW, as described above with respect to block 408.

Figure 12:
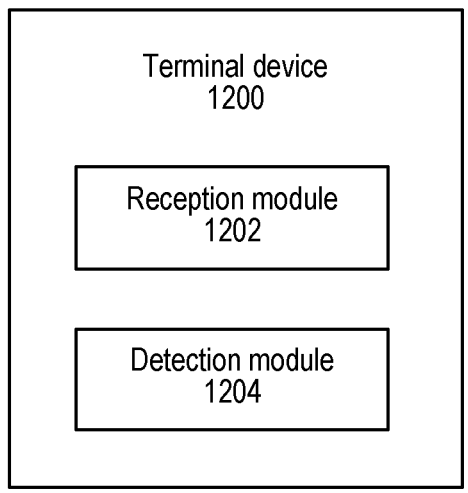
FIG. 12 is a block diagram showing a terminal device according to an embodiment of the disclosure.

FIG. 12 is a block diagram showing a terminal device according to an embodiment of the disclosure. As shown, the terminal device 1200 comprises a reception module 1202 and a detection module 1204. The reception module 1202 may be configured to receive, from a base station, a target WUS to PO mapping parameter, as described above with respect to block 902. The detection module 1204 may be configured to detect one or more WUSs in a PTW based on the target WUS to PO mapping parameter, as described above with respect to block 904. The target WUS to PO mapping parameter may be obtained by a paging related entity by obtaining first information about a probability at which each of at least one terminal device is paged at a PO. The at least one terminal device may comprise the terminal device. The target WUS to PO mapping parameter may be obtained by the paging related entity by obtaining second information about a first power consumption and a second power consumption spent by each of the at least one terminal device for detecting a WUS and a paging message respectively. The target WUS to PO mapping parameter may be obtained by the paging related entity by determining, for multiple applicable WUS to PO mapping parameters, corresponding power consumptions spent by the at least one terminal device in a PTW, based on the first and second information. The target WUS to PO mapping parameter may be obtained by the paging related entity by determining, as the target WUS to PO mapping parameter to be applied to the at least one terminal device, one of the multiple applicable WUS to PO mapping parameters corresponding to a lowest power consumption in a PTW. The modules described above may be implemented by hardware, or software, or a combination of both.

Figure 13:
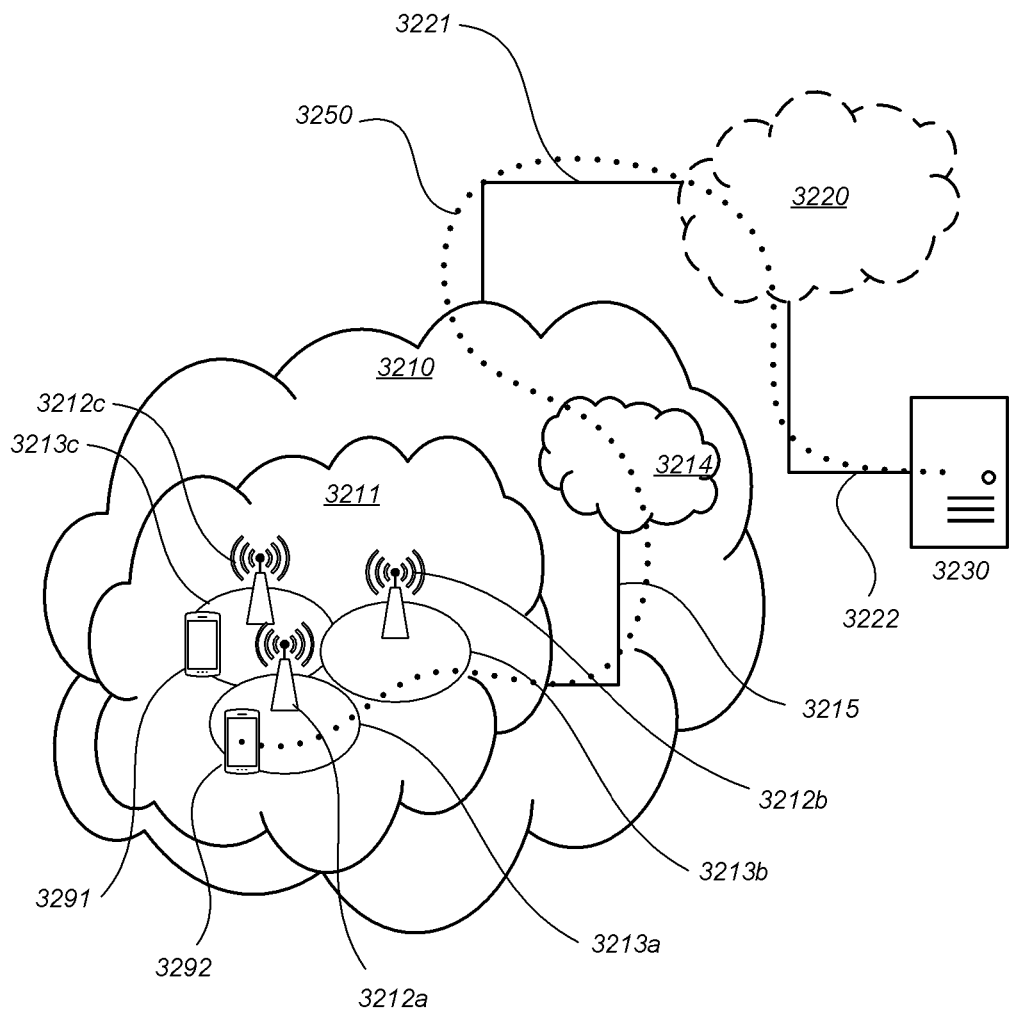
FIG. 13 is a diagram showing a telecommunication network connected via an intermediate network to a host computer in accordance with some embodiments.

With reference to FIG. 13, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 13 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 14. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 14) served by base station 3320. Communication interface 3326 may be configured to facilitate connection 3360 to host computer 3310. Connection 3360 may be direct or it may pass through a core network (not shown in FIG. 14) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 14:
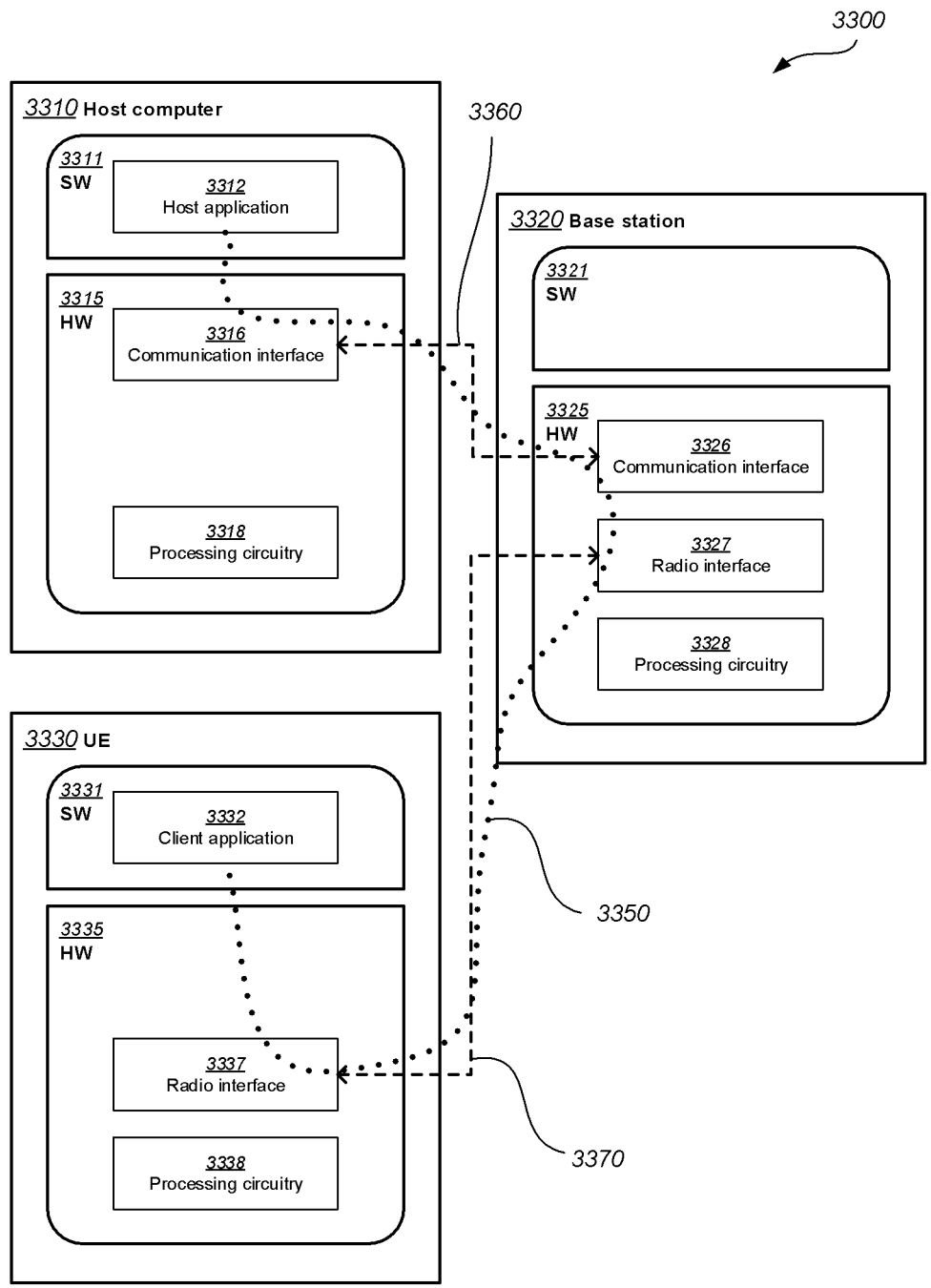
FIG. 14 is a diagram showing a host computer communicating via a base station with a user equipment in accordance with some embodiments.

It is noted that host computer 3310, base station 3320 and UE 3330 illustrated in FIG. 14 may be similar or identical to host computer 3230, one of base stations 3212*a*, 3212*b*, 3212*c* and one of UEs 3291, 3292 of FIG. 13, respectively. This is to say, the inner workings of these entities may be as shown in FIG. 14 and independently, the surrounding network topology may be that of FIG. 13.

In FIG. 14, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the power consumption and thereby provide benefits such as reduced power consumption.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 15:
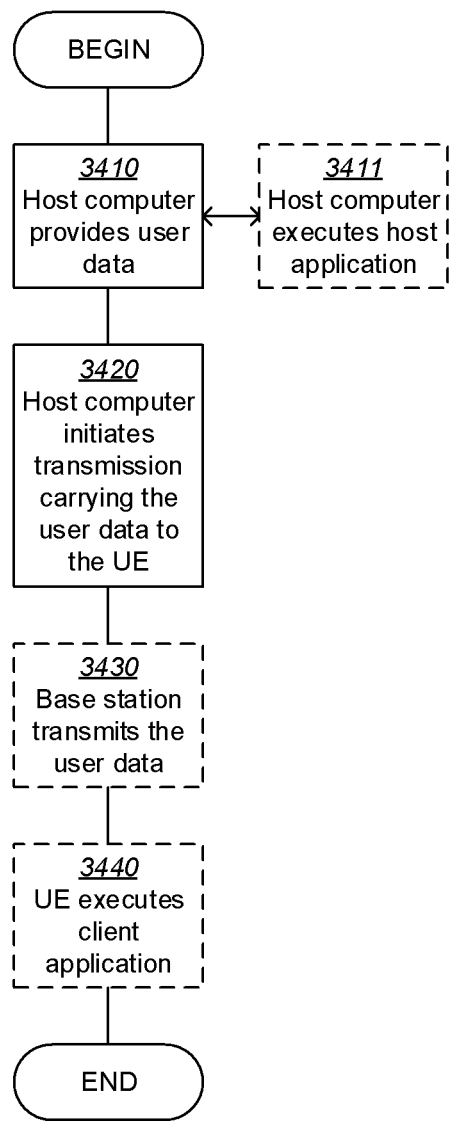
FIG. 15 is a flowchart illustrating a method implemented in a communication system in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 16:
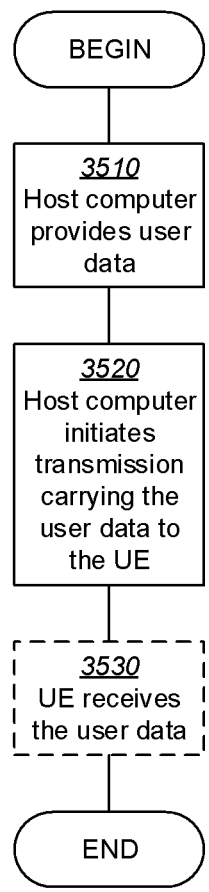
FIG. 16 is a flowchart illustrating a method implemented in a communication system in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 17:
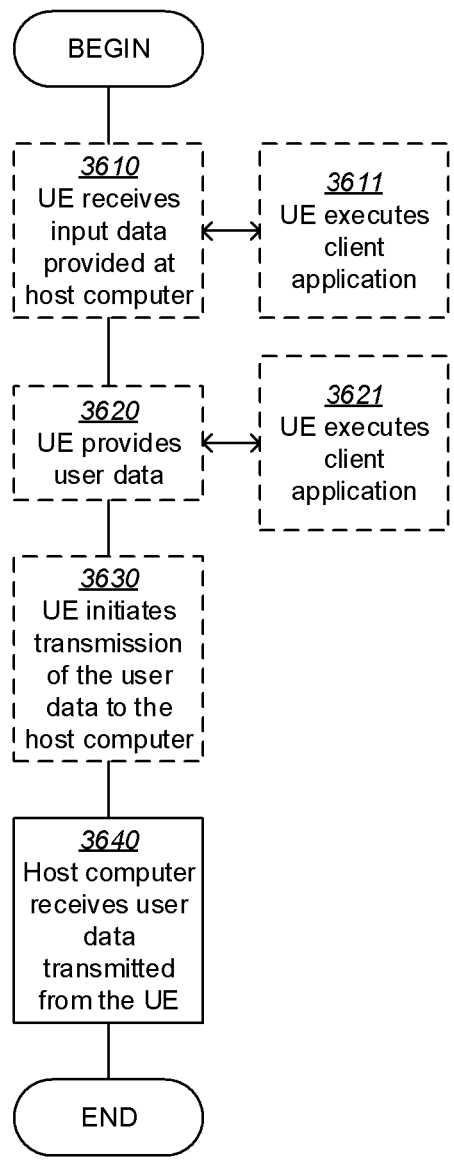
FIG. 17 is a flowchart illustrating a method implemented in a communication system in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 18:
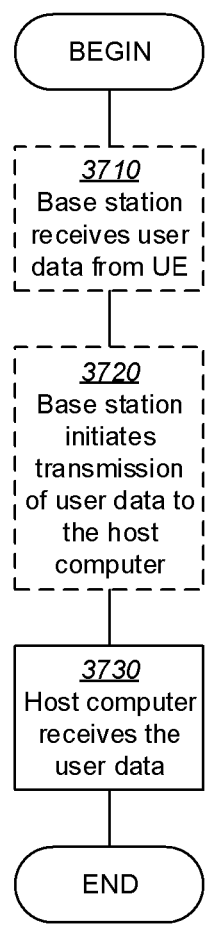
FIG. 18 is a flowchart illustrating a method implemented in a communication system in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may obtain first information about a probability at which each of at least one terminal device is paged at a PO. The base station may obtain second information about a first power consumption and a second power consumption spent by each of the at least one terminal device for detecting a WUS and a paging message respectively. The base station may determine, for multiple applicable WUS to PO mapping parameters, corresponding power consumptions spent by the at least one terminal device in a PTW, based on the first and second information. The base station may determine, as a target WUS to PO mapping parameter to be applied to the at least one terminal device, one of the multiple applicable WUS to PO mapping parameters corresponding to a lowest power consumption in a PTW.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to obtain first information about a probability at which each of at least one terminal device is paged at a PO. The base station's processing circuitry may be further configured to obtain second information about a first power consumption and a second power consumption spent by each of the at least one terminal device for detecting a WUS and a paging message respectively. The base station's processing circuitry may be further configured to determine, for multiple applicable WUS to PO mapping parameters, corresponding power consumptions spent by the at least one terminal device in a PTW, based on the first and second information. The base station's processing circuitry may be further configured to determine, as a target WUS to PO mapping parameter to be applied to the at least one terminal device, one of the multiple applicable WUS to PO mapping parameters corresponding to a lowest power consumption in a PTW.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

According to another aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The terminal device may receive, from a base station, a target WUS to PO mapping parameter. The terminal device may detect one or more WUSs in a PTW based on the target WUS to PO mapping parameter. The target WUS to PO mapping parameter may be obtained by a paging related entity by obtaining first information about a probability at which each of at least one terminal device is paged at a PO. The at least one terminal device may comprise the terminal device. The target WUS to PO mapping parameter may be obtained by the paging related entity by obtaining second information about a first power consumption and a second power consumption spent by each of the at least one terminal device for detecting a WUS and a paging message respectively. The target WUS to PO mapping parameter may be obtained by the paging related entity by determining, for multiple applicable WUS to PO mapping parameters, corresponding power consumptions spent by the at least one terminal device in a PTW, based on the first and second information. The target WUS to PO mapping parameter may be obtained by the paging related entity by determining, as the target WUS to PO mapping parameter to be applied to the at least one terminal device, one of the multiple applicable WUS to PO mapping parameters corresponding to a lowest power consumption in a PTW.

In an embodiment of the disclosure, the method may further comprise, at the terminal device, receiving the user data from the base station.

According to another aspect of the disclosure, there is provided a communication system including a host computer comprising processing circuitry configured to provide user data and a communication interface configured to forward user data to a cellular network for transmission to a terminal device. The terminal device may comprise a radio interface and processing circuitry. The processing circuitry of the terminal device may be configured to receive, from a base station, a target WUS to PO mapping parameter. The processing circuitry of the terminal device may be further configured to detect one or more WUSs in a PTW based on the target WUS to PO mapping parameter. The target WUS to PO mapping parameter may be obtained by a paging related entity by obtaining first information about a probability at which each of at least one terminal device is paged at a PO. The at least one terminal device may comprise the terminal device. The target WUS to PO mapping parameter may be obtained by the paging related entity by obtaining second information about a first power consumption and a second power consumption spent by each of the at least one terminal device for detecting a WUS and a paging message respectively. The target WUS to PO mapping parameter may be obtained by the paging related entity by determining, for multiple applicable WUS to PO mapping parameters, corresponding power consumptions spent by the at least one terminal device in a PTW, based on the first and second information. The target WUS to PO mapping parameter may be obtained by the paging related entity by determining, as the target WUS to PO mapping parameter to be applied to the at least one terminal device, one of the multiple applicable WUS to PO mapping parameters corresponding to a lowest power consumption in a PTW.

In an embodiment of the disclosure, the communication system may further include the terminal device.

In an embodiment of the disclosure, the cellular network may further include a base station configured to communicate with the terminal device.

In an embodiment of the disclosure, the processing circuitry of the host computer may be configured to execute a host application, thereby providing the user data. The processing circuitry of the terminal device may be configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a paging related entity, comprising:
    obtaining first information about a probability at which each of at least one terminal device is paged at a paging occasion (PO);
    obtaining second information about a first power consumption and a second power consumption spent by each of the at least one terminal device for detecting a wake up signal (WUS) and a paging message respectively;
    determining, for multiple applicable WUS to PO mapping parameters, corresponding power consumptions spent by the at least one terminal device in a paging time window (PTW), based on the first and second information; and
    determining, as a target WUS to PO mapping parameter to be applied to the at least one terminal device, one of the multiple applicable WUS to PO mapping parameters corresponding to a lowest power consumption in a PTW.

2. The method according to claim 1, wherein obtaining the first information comprises:
    determining the first information based on records about historical paging events directed to the at least one terminal device.

3. The method according to claim 1, wherein a number of the at least one terminal device is more than one; and wherein the first information is an average value of the probabilities at which each of the more than one terminal devices is paged at a PO.

4. The method according to claim 1, wherein obtaining the second information comprises:
    obtaining a radio channel quality of each of the at least one terminal device; and
    determining the second information based on the obtained radio channel quality and a table, wherein the table indicates correspondences between different radio channel qualities and different first and second power consumptions or wherein the table indicates correspondences between different radio channel qualities and different ratios between the first and second power consumptions.

5. The method according to claim 1, wherein a number of the at least one terminal device is more than one;
    wherein the second information includes an average value of the first power consumptions corresponding to the more than one terminal devices and an average value of the second power consumptions corresponding to the more than one terminal devices; or
    wherein the second information is an average value of ratios between the first and second power consumptions which correspond to the more than one terminal devices.

6. The method according to claim 1, wherein for an applicable WUS to PO mapping parameter, the corresponding power consumption spent by a terminal device in a PTW is determined as:
    a sum of x multiplied by a first estimate of power consumption and (1−x) multiplied by a second estimate of power consumption, where x denotes the probability at which the terminal device is paged at a PO.

7. The method according to claim 6, wherein the applicable WUS to PO mapping parameter is one;
    wherein the first estimate equals to a sum of the first power consumption multiplied by a number of WUSs expected to be detected until the terminal device is paged, and the second power consumption; and
    wherein the second estimate equals to the first power consumption multiplied by a number of POs in a PTW.

8. The method according to claim 7, wherein the number of WUSs expected to be detected until the terminal device is paged equals to an average value of integers from one to the number of POs in a PTW.

9. The method according to claim 6, wherein the applicable WUS to PO mapping parameter is an integer greater than one;
    wherein the first estimate equals to a sum of the second power consumption multiplied by a number of paging messages expected to be detected until the terminal device is paged, and the first power consumption; and
    wherein the second estimate equals to the first power consumption multiplied by a quotient between a number of POs in a PTW and the applicable WUS to PO mapping parameter.

10. The method according to claim 9, wherein the number of paging messages expected to be detected until the terminal device is paged equals to an average value of integers from one to the applicable WUS to PO mapping parameter.

11. A method performed by a terminal device, comprising:
    receiving, from a base station, a target wake up signal (WUS) to paging occasion (PO) mapping parameter; and detecting one or more WUSs in a paging time window (PTW), based on the target WUS to PO mapping parameter;

wherein the target WUS to PO mapping parameter is obtained by a paging related entity by:

obtaining first information about a probability at which each of at least one terminal device is paged at a PO, wherein the at least one terminal device comprises the terminal device;

obtaining second information about a first power consumption and a second power consumption spent by each of the at least one terminal device for detecting a WUS and a paging message respectively;

determining, for multiple applicable WUS to PO mapping parameters, corresponding power consumptions spent by the at least one terminal device in a PTW, based on the first and second information; and determining, as the target WUS to PO mapping parameter to be applied to the at least one terminal device, one of the multiple applicable WUS to PO mapping parameters corresponding to a lowest power consumption in a PTW.

12. The method according to claim 11, wherein the paging related entity is the base station or an entity responsible for mobility management.

13. A paging related entity comprising:
at least one processor; and
at least one memory, the at least one memory containing instructions executable by the at least one processor, whereby the paging related entity is operative to:

obtain first information about a probability at which each of at least one terminal device is paged at a paging occasion (PO);

obtain second information about a first power consumption and a second power consumption spent by each of the at least one terminal device for detecting a wake up signal (WUS) and a paging message respectively;

determine, for multiple applicable WUS to PO mapping parameters, corresponding power consumptions spent by the at least one terminal device in a paging time window (PTW), based on the first and second information; and determine, as a target WUS to PO mapping parameter to be applied to the at least one terminal device, one of the multiple applicable WUS to PO mapping parameters corresponding to a lowest power consumption in a PTW.

14. A terminal device comprising:
at least one processor; and
at least one memory, the at least one memory containing instructions executable by the at least one processor, whereby the terminal device is operative to:

receive, from a base station, a target wake up signal (WUS) to paging occasion (PO) mapping parameter; and detect one or more WUSs in a paging time window (PTW), based on the target WUS to PO mapping parameter;

wherein the target WUS to PO mapping parameter is obtained by a paging related entity by:

obtaining first information about a probability at which each of at least one terminal device is paged at a PO, wherein the at least one terminal device comprises the terminal device;

obtaining second information about a first power consumption and a second power consumption spent by each of the at least one terminal device for detecting a WUS and a paging message respectively;

determining, for multiple applicable WUS to PO mapping parameters, corresponding power consumptions spent by the at least one terminal device in a PTW, based on the first and second information; and determining, as the target WUS to PO mapping parameter to be applied to the at least one terminal device, one of the multiple applicable WUS to PO mapping parameters corresponding to a lowest power consumption in a PTW.

* * * * *